(12) United States Patent
Koori et al.

(10) Patent No.: US 9,689,098 B2
(45) Date of Patent: Jun. 27, 2017

(54) METHOD FOR PRODUCING SPUN-BONDED NONWOVEN FABRIC

(75) Inventors: Yohei Koori, Chiba (JP); Tomoaki Takebe, Chiba (JP); Yutaka Minami, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 974 days.

(21) Appl. No.: 13/982,641

(22) PCT Filed: Jan. 31, 2012

(86) PCT No.: PCT/JP2012/052161
§ 371 (c)(1),
(2), (4) Date: Jul. 30, 2013

(87) PCT Pub. No.: WO2012/105567
PCT Pub. Date: Aug. 9, 2012

(65) Prior Publication Data
US 2013/0309931 A1    Nov. 21, 2013

(30) Foreign Application Priority Data
Feb. 1, 2011  (JP) ................. 2011-020154

(51) Int. Cl.
| | | |
|---|---|---|
| *D01F 1/02* | (2006.01) | |
| *D01F 1/09* | (2006.01) | |
| *D04H 3/16* | (2006.01) | |
| *D04H 3/007* | (2012.01) | |
| *D04H 3/147* | (2012.01) | |
| *D01D 5/098* | (2006.01) | |
| *D01F 1/10* | (2006.01) | |
| *D01F 6/46* | (2006.01) | |
| *C08L 23/02* | (2006.01) | |
| *C08L 91/06* | (2006.01) | |
| *C08L 91/00* | (2006.01) | |

(52) U.S. Cl.
CPC ............ *D04H 3/16* (2013.01); *D01D 5/0985* (2013.01); *D01F 1/10* (2013.01); *D01F 6/46* (2013.01); *D04H 3/007* (2013.01); *D04H 3/147* (2013.01); *C08L 23/02* (2013.01); *C08L 91/00* (2013.01); *C08L 91/06* (2013.01); *Y10T 442/681* (2015.04)

(58) Field of Classification Search
CPC ..... D01F 1/02; D01F 1/09; D01F 1/10; D01F 6/46; D04H 3/0007

USPC ......................... 264/103, 235, 346
See application file for complete search history.

(56) References Cited

U.S. PATENT DOCUMENTS

2006/0135699 A1* 6/2006 Li ............................ D01F 6/46
525/240
2010/0190405 A1   7/2010 Takebe et al.

FOREIGN PATENT DOCUMENTS

| JP | 10-315327 | 12/1998 |
|---|---|---|
| JP | 2005-281951 | 10/2005 |
| JP | 2006-103147 | 4/2006 |
| JP | 2009-62667 | 3/2009 |
| JP | 2010-150732 | 7/2010 |
| WO | WO 2009/001871 A1 | 12/2008 |

OTHER PUBLICATIONS

International Search Report issued Apr. 24, 2012 in PCT/JP2012/052161.
A Zambelli, et al., "Communications to the Editor", Macromolecules, vol. 8, No. 5, Sep.-Oct. 1975, pp. 687-689.
A Zambelli, et al., "Communications to the Editor", Macromolecules, vol. 6, No. 6, Nov.-Dec. 1973 pp. 925-926.

* cited by examiner

*Primary Examiner* — Leo B Tentoni
(74) *Attorney, Agent, or Firm* — Oblon, McClelland, Maier & Neustadt, L.L.P.

(57) ABSTRACT

The method of producing a spunbond nonwoven fabric promotes the bleed out of the additive, which has pleasant texture such as tactile feel and excellent flexibility. The spunbond nonwoven fabric is obtained by this method. Specifically, (1) the method of producing a spunbond nonwoven fabric includes annealing a spunbond nonwoven fabric formed by using a crystalline resin composition (I) containing a low crystalline olefin polymer (a) with an elastic modulus of 10 to 450 MPa in a content of 1 to 50% by mass, a high crystalline olefin polymer (b) with an elastic modulus of 500 to 2,000 MPa, the content of the component (b) being the rest, and an additive (c) in a content of 1 to 20,000 ppm by mass. Furthermore, (2) the method of producing a spunbond nonwoven fabric includes annealing a spunbond nonwoven fabric formed by using a core-sheath composite fiber containing a crystalline resin composition (I) as the sheath component; and a crystalline resin composition (II) as the core component containing a high crystalline olefin polymer (b') with an elastic modulus of 500 to 2,000 MPa.

10 Claims, No Drawings

METHOD FOR PRODUCING SPUN-BONDED NONWOVEN FABRIC

TECHNICAL FIELD

The present invention relates to a method of producing a spunbond nonwoven fabric with pleasant texture such as tactile feel and to the spunbond nonwoven fabric obtained by this method.

BACKGROUND ART

In recent years, polypropylene fibers and nonwoven fabrics are subjected to various applications including a disposable diaper, a sanitary product, other hygienic products, a clothing material, a bandage, and a packaging material. Such fibers and nonwoven fabrics are often used directly on the skin and are thus demanded to have suitable elasticity and elastic recovery properties from the viewpoint of good wear feeling to the body and of easy body motion after wearing. This has encouraged the various technological developments of the fibers and nonwoven fabrics. For example, Patent Literature 1 discloses an elastic nonwoven fabric with excellent elastic recovery properties and pleasant texture without stickiness and a textile product formed by using the elastic nonwoven fabric.

In addition, as a method of improving the texture such as tactile feel of the nonwoven fabric consisting of an olefin polymer, an additive such as a slipping agent is applied to the nonwoven fabric. This improves the tactile feel and the texture of the nonwoven fabric by bleeding the applied slipping agent into the surface of the nonwoven fabric.

CITATION LIST

Patent Literature

Patent Literature 1: JP-A-2009-62667

SUMMARY OF THE INVENTION

Technical Problem

However, in the nonwoven fabric formed by using a conventional high crystalline olefin polymer, the tactile feel and the texture of the nonwoven fabric is hardly significantly improved because the bleed-out properties of the additive is poor. In addition, there is room for further improvement in the flexibility.

Thus, the objective of the present invention is to provide a method of producing a spunbond nonwoven fabric with pleasant texture such as tactile feel and excellent flexibility and to the spunbond nonwoven fabric obtained by this method.

Solution to Problem

As the result of their extensive studies on the above-mentioned problems, the inventors found that a spunbond nonwoven fabric with pleasant texture such as tactile feel and excellent flexibility is produced by a spunbond method by using a crystalline resin composition containing a certain amount of a low crystalline olefin polymer with a specific elastic modulus, a high crystalline olefin polymer with a specific elastic modulus, and a specific amount of an additive and then annealed to promote the bleed out of the additive. The inventors thus achieved the present invention.

Specifically, the present invention relates to the following [1] to [10].

[1] A method of producing a spunbond nonwoven fabric, including annealing a spunbond nonwoven fabric formed by using a crystalline resin composition (I) containing a low crystalline olefin polymer (a) with an elastic modulus of 5 to 450 MPa in a content of 1 to 50% by mass, a high crystalline olefin polymer (b) with an elastic modulus of 500 to 2,000 MPa, the content of the component (b) being the rest, and an additive (c) in a content of 1 to 20,000 ppm by mass.

[2] A method of producing a spunbond nonwoven fabric, including annealing a spunbond nonwoven fabric formed by using a core-sheath composite fiber containing a crystalline resin composition (I) as the sheath component containing a low crystalline olefin polymer (a) with an elastic modulus of 5 to 450 MPa in a content of 1 to 50% by mass, a high crystalline olefin polymer (b) with an elastic modulus of 500 to 2,000 MPa, the content of the component (b) being the rest, and an additive (c) in a content of 1 to 20,000 ppm by mass; and a crystalline resin composition (II) as the core component containing a high crystalline olefin polymer (b') with an elastic modulus of 500 to 2,000 MPa.

[3] The method according to [2], wherein the ratio of the sheath component is 1 to 50% by mass based on the total amount of the core component and the sheath component.

[4] The method according to [2], wherein the ratio of the sheath component is 1 to 35% by mass based on the total amount of the core component and the sheath component.

[5] The method according to any one of [1] to [4], wherein the additive (c) is at least one kind selected from an antistatic agent, a release agent, a wax, an electric property modifier, an antislip agent, an antiblocking agent, an anticlouding agent, a lubricant, and an anti-adhesive agent.

[6] The method according to any one of [1] to [5], wherein the additive (c) is at least one kind selected from a wax and a lubricant.

[7] The method according to any one of [1] to [6], wherein the annealing is conducted at a temperature of from 30 to 60° C. for 1 to 48 hours.

[8] The method according to any one of [1] to [7], wherein the ratio of the static friction coefficient of a spunbond nonwoven fabric after annealing to the static friction coefficient of a spunbond nonwoven fabric before annealing (static friction coefficient after annealing/static friction coefficient before annealing) is 0.85 or less.

[9] The method according to any one of [1] to [8], wherein the low crystalline olefin polymer (a) is a polypropylene polymer.

[10] A spunbond nonwoven fabric obtained by the method according to any one of [1] to [9].

Advantageous Effects of the Invention

According to the method of the present invention, the bleed out of the additive is promoted so as to produce a spunbond nonwoven fabric with pleasant texture such as tactile feel and excellent flexibility. Furthermore, the promoted bleed out of the additive can decrease the mixing amount itself of the additive.

MODE FOR CARRYING OUT THE INVENTION

The spunbond nonwoven fabric of the present invention is produced by annealing a spunbond nonwoven fabric formed by using a crystalline resin composition (I) containing a low crystalline olefin polymer (a) with a specific elastic modulus, a high crystalline olefin polymer (b) with a specific elastic modulus, and an additive (c) in respective specific ratios.

In the present invention, the low crystalline olefin polymer (a) has moderately disturbed stereoregularity, which specifically means an olefin polymer with an elastic modulus of 5 to 450 MPa. If the elastic modulus of an olefin polymer used as the low crystalline olefin polymer (a) is less than 5 MPa, the crystallinity and the crystallization rate are too low. This causes a sticky nonwoven fabric with the moldability and the texture being deteriorated. If the elastic modulus is more than 450 MPa, the crystallinity increases to less promote the bleed out of the additive. From this viewpoint, the elastic modulus of the low crystalline olefin polymer (a) is preferably 5 to 200 MPa, more preferably 10 to 200 MPa, more preferably 10 to 100 MPa, more preferably 10 to 70 MPa, more preferably 10 to 60 MPa, more preferably 20 to 60 MPa, particularly preferably 30 to 60 MPa.

On the other hand, the high crystalline olefin polymer (b) means a high stereoregular olefin polymer with an elastic modulus of 500 to 2,000 MPa. If the elastic modulus of an olefin polymer used as the high crystalline olefin polymer (b) is less than 500 MPa, the crystallinity and the crystallization rate are decreased. This causes a sticky nonwoven fabric with the moldability and the texture being deteriorated. If the elastic modulus is more than 2,000 MPa, the spunbond nonwoven fabric is hard to the touch, and furthermore the crystallization rate is too high. This causes broken thread during the stretching process on the spinning line. From this viewpoint, the elastic modulus of the high crystalline olefin polymer (b) is preferably 700 to 2,000 MPa, more preferably 1,000 to 2,000 MPa, more preferably 1,000 to 1,800 MPa, further more preferably 1,200 to 1,800 MPa, particularly preferably 1,400 to 1,800 MPa.

Crystalline Resin Composition (I):
Low Crystalline Olefin Polymer (a):

The low crystalline olefin polymer (a) used in the present invention is preferably an olefin polymer generated by polymerizing one or more kinds of monomers selected from ethylene and α-olefins with 3 to 28 carbon atoms.

The α-olefins with 3 to 28 carbon atoms include, for example, propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, and 1-icosene. The α-olefin has preferably 3 to 16 carbon atoms, more preferably 3 to 10 carbon atoms, further more preferably 3 to 6 carbon atoms, which is particularly preferably propylene. The olefin polymer generated by polymerizing any one of these α-olefins alone or by copolymerizing any combination of two or more kinds may be used. In the present invention, the term "olefin polymer" connotes "olefin copolymer".

The low crystallinity of the low crystalline olefin polymer (a) creates an expectation that the exuding phenomenon (bleed out) of the additive (c) from the amorphous part wherein the molecular chain can flow is promoted by the annealing to improve the texture such as tactile feel and the flexibility.

Therefore, the olefin polymer is particularly preferably a polypropylene. The polypropylene may be copolymerized with the above-mentioned α-olefin other than propylene as long as having an elastic modulus of 5 to 450 MPa. In this case, the use ratio of the α-olefin other than propylene is preferably 2% by mass or less, more preferably 1% by mass or less based on the total amount of propylene and the α-olefin other than propylene.

The low crystalline olefin polymers (a) may be used alone or in combination with two or more kinds.

The melting point (Tm) of the low crystalline olefin polymer (a) used in the present invention is preferably from 0 to 140° C., more preferably from 0 to 120° C., more preferably from 20 to 120° C., more preferably from 20 to 100° C., more preferably from 40 to 100° C., further more preferably from 50 to 90° C., particularly preferably from 60 to 80° C. from the viewpoint of improving the bleed-out properties of the additive.

The melting point is defined as the peak top of a melt endothermic curve obtained by maintaining the temperature of 10 mg of the sample at 230° C. for 3 minutes and decreasing it to 0° C. at 10° C./minute; and then maintaining it 0° C. for 3 minutes and increasing it at 10° C./minute, under a nitrogen atmosphere, by using a differential scanning calorimeter (DSC-7 available from PerkinElmer, Inc.).

The low crystalline olefin polymer (a) preferably has a crystallization temperature (Tc) of preferably 10 to 60° C., more preferably 20 to 50° C., further more preferably 30 to 40° C. The melt flow rate (MFR) is preferably from 20 to 400 g/10 minutes, more preferably from 20 to 200 g/10 minutes, further more preferably from 20 to 100 g/10 minutes, particularly preferably from 40 to 80 g/10 minutes. The crystallization temperature and the MFR are values measured by the respective methods described in Examples.

The low crystalline olefin polymer (a) used in the present invention particularly preferably satisfies the following expressions (1) to (6), which is more preferably a low crystalline polypropylene satisfying the following expressions (1) to (6):

(1) [mmmm]=20 to 60% by mol
(2) [rrrr]/(1−[mmmm])<0.1
(3) [rmrm]>2.5% by mol
(4) [mm]×[rr]/[mr]$^2$≤2.0
(5) Weight-average molecular weight (Mw)=10,000 to 200,000, and
(6) Molecular weight distribution (Mw/Mn)<4, wherein [mmmm] represents a mesopentad fraction, [rrrr] represents a racemic pentad fraction, [rmrm] represents a racemic-meso-racemic-meso pentad fraction, [mm] represents a mesotriad fraction, [rr] represents a racemic triad fraction, and [mr] represents a meso-racemic triad fraction. These values were determined by the method described in Examples.

The above-mentioned expressions (1) to (6) will be explained below in turn.

(1) [mmmm]=20 to 60% by mol

The low crystalline polypropylene suitably used in the present invention has an [mmmm] (mesopentad fraction) of 20 to 60% by mol. When the [mmmm] is 20% by mol or more, the solidification after melting does not delay so as to avoid a sticky fiber. Accordingly, the nonwoven fabric is not attached to a winding roll but easily continuously formed. When the [mmmm] is 60% by mol or less, the crystallinity is not too high, and the elastic recovery properties is excellent. This provides more tactile feel of the spunbond nonwoven fabric. From this viewpoint, the [mmmm] is preferably 30 to 50% by mol, more preferably 40 to 50% by mol.

(2) [rrrr]/(1-[mmmm])≤0.1

The low crystalline polypropylene suitably used in the present invention has an [rrrr]/(1-[mmmm]) of preferably 0.1 or less. The [rrrr]/(1-[mmmm]) is an index representing the uniformity of the regularity distribution of the low crystalline polypropylene. If the value is too large, a mixture of a high stereoregular polypropylene and an atactic polypropylene is obtained like an ordinary polypropylene produced with an existing catalyst and causes a sticky fiber. From this viewpoint, [rrrr]/(1-[mmmm]) is preferably from 0.001 to 0.05, more preferably from 0.001 to 0.04, further more preferably from 0.01 to 0.04.

(3) [rmrm]>2.5by mol

The low crystalline polypropylene suitably used in the present invention has an [rmrm] of more than 2.5% by mol. When the [rmrm] is more than 2.5% by mol, the randomness of the low crystalline polypropylene can be maintained. This avoids the crystallinity to be increased due to crystallization caused by the isotactic polypropylene bock chain so as not to decrease the elastic recovery properties and therefore provides more tactile feel of the spunbond nonwoven fabric. From this viewpoint, the [rmrm] is preferably 2.6% by mol or more, more preferably 2.7% by mol or more. The upper limit is typically about 10% by mol, more preferably 7% by mol, further more preferably 5% by mol, particularly preferably 4% by mol.

(4)[mm]×[rr]/[mr]² ≤2.0

The low crystalline polypropylene suitably used in the present invention has an [mm]×[rr]/[mr]² of preferably 2.0 or less. The [mm]×[rr]/[mr]² is an index representing the randomness of a polymer. When this value is 2.0 or less, a fiber obtained by spinning has sufficient elastic recovery properties. This provides more tactile feel of the spunbond nonwoven fabric and is controlled not to be sticky. From this viewpoint, the [mm]×[rr]/[mr]² is preferably more than 0.25 and 1.8 or less, more preferably from 0.5 to 1.8, further more preferably from 1 to 1.8, particularly preferably from 1.2 to 1.6.

(5) Weight-average molecular weight (Mw)=10,000 to 200,000

The low crystalline polypropylene suitably used in the present invention has a weight-average molecular weight of 10,000 to 200,000. When the weight average molecular weight is 10,000 or more, the viscosity of the low crystalline polypropylene is not too low but is moderate so as to avoid a broken thread upon spinning. When the weight average molecular weight is 200,000 or less, the viscosity of the low crystalline polypropylene is not too high to increase the spinnability. From this viewpoint, the weight-average molecular weight is preferably from 30,000 to 200,000, more preferably from 40,000 to 150,000, further more preferably from 80,000 to 150,000, particularly preferably from 100,000 to 140,000.

(6) Molecular weight distribution (Mw/Mn)<4

The low crystalline polypropylene suitably used in the present invention has a molecular weight distribution (Mw/Mn) of preferably less than 4. When the molecular weight distribution is less than 4, the fiber obtained by spinning is controlled not to be sticky. The molecular weight distribution is preferably 3 or less, more preferably 2.5 or less, further more preferably from 1.5 to 2.5.

Process of Producing Low Crystalline Olefin Polymer (a):

As the process of producing the low crystalline olefin polymer (a) used in the present invention, the α-olefin such as propylene is preferably polymerized or copolymerized by using a metallocene catalyst obtained by combining (A) a transition metal compound having a crosslinked structure through two crosslinking groups with (B) a promoter.

Specifically, the α-olefin such as propylene is polymerized or copolymerized in the presence of a polymerization catalyst containing a promoter component (B) selected from a transition metal compound (A) represented by the following general formula (i); a compound (B-1) capable of forming an ionic complex through reaction with a transition metal compound as the component (A) or a derivative thereof; and an aluminoxane (B-2).

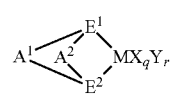

(i)

In the general formula (i), M represents a metal element of the groups 3 to 10 in the periodic table or of lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, forming a crosslinked structure through $A^1$ and $A^2$, $E^1$ and $E^2$ may be the same or different from each other; X represents a σ-bonding ligand, wherein when exist, a plurality of "X"s may be the same or different from each other and may be crosslinked to another X, $E^1$, $E^2$, or Y. Y represents a Lewis base, wherein when exist, a plurality of "Y"s may be the same or different from each other and may be crosslinked to another Y, $E^1$, $E^2$, or X; $A^1$ and $A^2$ are each a divalent crosslinking group bonding two ligands and each represent a hydrocarbon group with 1 to 20 carbon atoms, a halogen-containing hydrocarbon group with 1 to 20 carbon atoms, a silicon-containing group, a germanium-containing group, a tin-containing group, —O—, —CO—, —S—, —SO₂—, —Se—, —NR¹—, —PR¹—, —P(O)R¹—, —BR¹—, or —AlR¹—, wherein $R^1$ represents a hydrogen atom, a halogen atom, a hydrocarbon group with 1 to 20 carbon atoms, or a halogen-containing hydrocarbon group with 1 to 20 carbon atoms, and $A^1$ and $A^2$ may be the same or different from each other. q represents an integer of 1 to 5 i.e., {(atomic valence of M)−2}; and r represents an integer of 0 to 3.

The specific example of the transition metal compound represented by the general formula (i) includes (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride,(1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-di-isopropylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-isopropylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl)zirconium dichloride, and (1,2'-dimethylsilylene)(2,1'-isopropylidene)-bis(3-trimethylsilylmethylindenyl) zirconium dichloride; and these compounds wherein the zirconium is substituted with titanium or hafnium.

The component (B-1) as the component (B) includes dimethyl anilinium tetrakis pentafluorophenyl borate, triethylammonium tetraphenyl borate, tri-n-butylammonium tetraphenyl borate, trimethylammonium tetraphenyl borate, tetraethylammonium tetraphenyl borate, methyl (tri-n-butyl) ammonium tetraphenyl borate, and benzyl (tri-n-butyl) ammonium tetraphenyl borate.

These components (B-1) may be used alone or in combination with two or more kinds. On the other hand, the aluminoxane as the component (B-2) includes methylaluminoxane, ethylaluminoxane, and isobutylaluminoxane. These aluminoxanes may be used alone or in combination with two or more kinds. Alternatively, one or more kinds of the components (B-2) may be used together with one or more kinds of the components (B-1).

As the above-mentioned polymerization catalyst, an organoaluminum compound can be used as the component (C) in addition to the above-mentioned components (A) and (B). The organoaluminum compound as the component (C) includes trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organoaluminum compounds may be used alone or in combination with two or more kinds. In the polymerization of propylene, at least one kind of the catalytic components can be supported to a suitable carrier.

The polymerization process is not limited in particular, which may be conducted by slurry polymerization, gas phase polymerization, bulk polymerization, solution polymerization, suspension polymerization, or the like. However, bulk polymerization and solution polymerization are particularly preferable. The polymerization temperature is typically from −100° C. to 250° C. The use ratio of the catalyst to the reactive raw material "raw material monomer/component (A)" (mole ratio) is preferably from 1 to $10^8$, more preferably from 10 to $10^5$, further more preferably from $10^2$ to $10^5$. The polymerization time is typically preferably from 5 minutes to 10 hours. The reaction pressure is typically preferably from normal pressure to 20 MPa (gauge pressure).

High Crystalline Olefin Polymer (b):

The melting point (Tm) of the high crystalline olefin polymer (b) is preferably from 120 to 200° C., more preferably from 130 to 180° C., further more preferably from 150 to 175° C. The melt flow rate (MFR) of the high crystalline olefin polymer is preferably from 1 to 100 g/10 minutes, more preferably from 10 to 80 g/10 minutes, further more preferably from 15 to 80 g/10 minutes, particularly preferably from 15 to 50 g/10 minutes. Such a high crystalline olefin polymer can easily be produced by the method described in JP-A-2006-103147 or the like.

The high crystalline olefin polymer (b) used in the present invention is preferably an olefin polymer generated by polymerizing one or more kinds of monomers selected from ethylene and α-olefins with 3 to 28 carbon atoms. These α-olefins can be illustrated by the above-mentioned ones. The high crystalline olefin polymer (b) is particularly preferably a propylene homopolymer, a propylene-ethylene random copolymer, a propylene-ethylene-1-butene random copolymer, and a propylene-ethylene block copolymer, more preferably a propylene homopolymer (polypropylene).

Additive (c):

The additive (c) is not limited in particular as long as being useful for being bled into the surface of the fiber by the below-mentioned annealing used in the present invention. The additive (c) includes, for example, an antistatic agent, a release agent, a wax, an electric property modifier, an antislip agent, an antiblocking agent, an anticlouding agent, a lubricant, and an anti-adhesive agent. Particularly, when a wax and a lubricant are used, the effect of the present invention is significantly produced.

Other Additives (d):

The crystalline resin composition (I) used in the present invention may contain other additives (d). Such additives (d) include, for example, a foaming agent, a crystal nucleating agent, a weathering stabilizer, an ultraviolet absorber, a photostabilizer, a heat-resistant stabilizer, a flame retarder, a synthetic oil, an electric property modifier, an antislip agent, an antiblocking agent, an anticlouding agent, a lubricant, and an anti-adhesive agent.

As described above, the crystalline resin composition (I) contains a low crystalline olefin polymer (a) with an elastic modulus of 5 to 450 MPa in a content of 1 to 50% by mass, a high crystalline olefin polymer (b) with an elastic modulus of 500 to 2,000 MPa, and an additive (c) in a content of 1 to 20,000 ppm by mass.

If the content of the low crystalline olefin polymer (a) in the crystalline resin composition (I) is less than 1% by mass, the bleed-out properties of the nonwoven fabric is scarcely improved. If the content of the low crystalline olefin polymer is more than 50% by mass, the moldability and the texture are decreased due to the stickiness of the nonwoven fabric, and the strength of the nonwoven fabric is also decreased. From this viewpoint, the content of the low crystalline olefin polymer (a) in the crystalline resin composition (I) is preferably 1 to 40% by mass, more preferably 1 to 30% by mass, further more preferably 2 to 20% by mass, particularly preferably 2 to 15% by mass.

If the content of the additive (c) in the crystalline resin composition (I) is less than 1 ppm by mass, the effect of the annealing is hardly clearly produced because the content is too small. On the other hand, if the content is more than 20,000 ppm by mass, the effect is less produced on such increased additive amount. From this viewpoint, the content of the additive (c) in the crystalline resin composition (I) is preferably 1 to 15,000 ppm by mass, more preferably 1 to 10,000 ppm by mass, more preferably 10 to 10,000 ppm by mass, more preferably 100 to 10,000 ppm by mass, more preferably 500 to 10,000 ppm by mass, further more preferably 500 to 7,000 ppm by mass, particularly preferably 1,000 to 5,000 ppm by mass.

The crystalline resin composition (I) may contain a thermoplastic resin other than the low crystalline olefin polymer (a) and the high crystalline olefin polymer (b). Such a thermoplastic resin includes, for example, an ethylene-vinyl acetate copolymer, a hydrogenated styrene elastomer, a polyester resin, and a polyamide resin. These may be used alone or in combination with two or more kinds.

When a thermoplastic resin other than the crystalline resin composition (I) is contained, the content is preferably 30% by mass or less, more preferably 20% by mass or less, further more preferably 10% by mass or less, particularly preferably 5% by mass or less in the crystalline resin composition (I).

The content of the high crystalline olefin polymer (b) in the crystalline resin composition (I) is "the rest" after subtraction of the content of other each component.

Crystalline Resin Composition (II):

The spunbond nonwoven fabric of the present invention may be formed by using a core-sheath composite fiber containing the crystalline resin composition (I) as the sheath component and the crystalline resin composition (II) containing the high crystalline olefin polymer (b') as the core component, as described below.

The high crystalline olefin polymer (b') contained in the crystalline resin composition (II) is defined in the same way as the high crystalline olefin polymer (b) contained in the crystalline resin composition (I). Suitable high crystalline olefin polymers (b') are also the same as those listed for the high crystalline olefin polymer (b). Furthermore, the crystalline resin composition (II) may contain the same thermoplastic resin or the like other than the additives (c) and (d) and the high crystalline olefin polymer (b') as those contained in the crystalline resin composition (I).

The content of the high crystalline olefin polymer (b') in the crystalline resin composition (II) is preferably 60% by mass or more, more preferably 80% by mass or more, more preferably 90% by mass or more, further more preferably 95% by mass or more, particularly preferably substantially 100% by mass.

Method of Producing Spunbond Nonwoven Fabric:

In the present invention, the spunbond nonwoven fabric formed by using the above-mentioned crystalline resin composition (I) is annealed so as to produce a target spunbond nonwoven fabric. The spunbond nonwoven fabric before the annealing is hereinafter sometimes referred to as "untreated spunbond nonwoven fabric". The spunbond nonwoven fabric after the annealing is hereinafter sometimes referred to as "the spunbond nonwoven fabric of the present invention".

The spunbond nonwoven fabric of the present invention may be formed by using a core-sheath composite fiber containing the crystalline resin composition (I) as the sheath component and the crystalline resin composition (II) containing the high crystalline olefin polymer (b') as the core component, as needed.

The method of producing an untreated nonwoven fabric of the present invention is not limited in particular. For the method, any well-known spunbond methods can be used. A nonwoven fabric produced by a spunbond method is hereinafter referred to as a spunbond nonwoven fabric.

Typically, in the spunbond method, an untreated spunbond nonwoven fabric is produced in such a manner that a melt-kneaded crystalline resin composition (I) or (II) is spun, stretched, and filamentized to form continuous long fibers. In the subsequent process, the continuous long fibers are accumulated and entangled on a moving collecting surface. In this method, an untreated spunbond nonwoven fabric may be produced continuously, which has a large strength since fibers composing the nonwoven fabric are stretched continuous long fibers.

As the spunbond method, conventional well-known methods can be used. Fiber can be produced by extruding a melt polymer, for example, from a large nozzle with several thousands of pores or a group of small nozzles with about 40 pores. The ejection amount of fiber per single pore is preferably from 0.1 to 1 g/minute, more preferably from 0.3 to 0.7 g/minute. After ejected from the nozzle, melt fiber is cooled by a cross-flow cold air system, drawn away from the nozzle, and stretched by high-speed airflow. Generally, there exist two kinds of air-damping, both of which use a venturi effect. In the first air-damping, a filament is stretched by using a suction slot (slot stretching). This method is conducted by using the width of a nozzle or the width of a machine. In the second air-damping, a filament is stretched through a nozzle or a suction gun. A filament formed by this air-damping is collected to form a web on a screen (wire) or a pore forming belt. Subsequently, the web passes a compression roll and then between heating calendar rolls; and bounded at the part where the embossment part on one roll includes from 10 to 40% of the area of the web to form an untreated spunbond nonwoven fabric.

As the bonding, thermal bonding including emboss, hot air, and calendar, adhesive bonding, and mechanical bonding including needle punch and water punch can be used.

The method of producing a multilayered nonwoven fabric is also not limited in particular. The multilayered nonwoven fabric can be produced by a well-known method. For example, a first nonwoven fabric is produced by using a crystalline resin composition containing the low crystalline olefin polymer (a). On the first nonwoven fabric, a second nonwoven fabric is formed by a spunbond method, a melt blowing method, or the like. Optionally, a third nonwoven fabric is overlaid on the second layer and fusion-bounded by being heated under pressure. There are various laminate means for forming the multilayered nonwoven fabric, such as thermal bonding and adhesive bonding. A convenient and inexpensive thermal bonding, particularly heat embossing roll can also be used. The heat embossing roll can conduct lamination with a well-known laminate device equipped with an embossing roll and a flat roll. As the embossing roll, emboss patterns of various shapes can be used, which include a lattice pattern wherein each adhesion part is consecutive, an independent lattice pattern, and arbitrary distribution.

The flexibility of the untreated spunbond nonwoven fabric, i.e. the flexibility of the spunbond nonwoven fabric of the present invention can be controlled by adjusting the temperature and the spinning speed during embossing.

When the spunbond nonwoven fabric with high flexibility is obtained by controlling the temperature during embossing, the temperature preferably falls within the range of from 90 to 130° C. When the embossing temperature is 90° C. or more, fibers sufficiently fuses with each other to increase the strength of the spunbond nonwoven fabric of the present invention. When the embossing temperature is 130° C. or less, the low crystalline olefin polymer (a) may not completely melt into a film so as to form the high flexible spunbond nonwoven fabric of the present invention.

In the present invention, the untreated spunbond nonwoven fabric obtained as described above is annealed. The temperature during the annealing is preferably from 30 to 60° C., more preferably from 35 to 60° C., further more preferably from 35 to 55° C., particularly preferably from 40 to 50° C. The annealing time is preferably from 1 to 48 hours, more preferably from 5 to 48 hours, further more preferably from 10 to 40 hours, particularly more preferably from 15 to 30 hours. Thus, annealing the untreated spunbond nonwoven fabric promotes the bleed out of the additive (c) so as to provide a spunbond nonwoven fabric with pleasant texture and excellent flexibility.

Spunbond Nonwoven Fabric:

The spunbond nonwoven fabric of the present invention obtained as described above preferably includes (1) one or more layers, wherein at least one of the layers when the nonwoven fabric has one or two layers or at least one of the both outermost layers when the nonwoven fabric has three or more layers is formed by using the crystalline resin composition (I).

In the spunbond nonwoven fabric including two layers, the two layers are preferably formed by using the crystalline resin composition (I). In the spunbond nonwoven fabric including three or more layers, the both outermost layers are preferably formed by using the crystalline resin composition (I).

In the nonwoven fabric (1), the amount used of the crystalline resin composition (I) is preferably 1 to 100% by mass, more preferably 30 to 100% by mass, more preferably 50 to 100% by mass, further more preferably 70 to 100% by mass, particularly preferably 90 to 100% by mass, most preferably substantially 100% by mass based on the total amount of the nonwoven fabric.

A layer not formed by using the crystalline resin composition (I) when exists in the nonwoven fabric consisting of two layers and a layer not formed by using the crystalline resin composition (I) in the nonwoven fabric consisting of three or more layers each have any component without particular limitation. As the component, a resin composition containing a typical thermoplastic resin used for a nonwoven fabric can be used. Among these, the crystalline resin composition (II) containing the high crystalline olefin polymer (b) is preferable, and the crystalline resin composition (II) containing the high crystalline polypropylene is more preferable. The crystalline resin composition (II) may contain a thermoplastic resin and additives (c) and (d) that can be used with the crystalline resin composition (I).

Spunbond Nonwoven Fabric Formed by Using Core-Sheath Composite Fiber:

The alternative nonwoven fabric of the present invention includes (2) one or more layers, wherein the layers each consist of a fiber, the fiber of at least one of the layers when the nonwoven fabric has one or two layers or the fibers of the both outermost layers when the nonwoven fabric has three or more layers each are the core-sheath composite fiber containing a crystalline resin composition (I) as the sheath component and the crystalline resin composition (II) as the core component, and the ratio of the sheath component is preferably 1 to 99% by mass, more preferably 5 to 50% by mass, further more preferably 10 to 35% by mass based on the total amount of the core component and the sheath component. The content of the core-sheath composite fiber in such a nonwoven fabric is preferably 1 to 100% by mass, more preferably 10 to 100% by mass, more preferably 30 to 100% by mass, more preferably 50 to 100% by mass, more preferably 70 to 100% by mass, further more preferably 80 to 100% by mass, particularly preferably 90 to 100% by mass, most preferably substantially 100% by mass.

In the nonwoven fabric consisting of two layers, fibers composing the both two layers each are preferably the core-sheath composite fiber. In the nonwoven fabric consisting of three or more layers, fibers composing the both outermost layers each are preferably the core-sheath composite fiber.

The textile product formed by using the spunbond nonwoven fabric of the present invention, for example, can includes a material for a disposable diaper, an elastic material for a diaper cover, an elastic material for a sanitary product, an elastic material for a hygienic product, an elastic tape, an adhesive plaster, an elastic material for a clothing material, an electric insulating material for a clothing material, a thermal insulating material for a clothing material, a protective garment, a headwear, a face mask, a glove, an athletic supporter, an elastic bandage, a base cloth for a wet dressing, an antislipping base cloth, a vibration dampener, a finger stall, an air filter for a clean room, an electret filter, a separator, a thermal insulating material, a coffee bag, a food packaging material, a ceiling surface material for an automobile, an acoustic insulating material, a cushioning material, a dust proof material for a speaker, an air cleaner material, an insulator surface material, a backing material, an adhesive nonwoven fabric sheet, various automobile members including a door trim material, various cleaning materials including a cleaning material for a copying machine, a surface material and a backing material of a carpet, an agricultural rolled cloth, a wood draining material, a shoe material such as a surface material for sport shoes, a member for a bag, an industrial sealant, a wiping material, and a bed sheet. In particular, the nonwoven fabric of the present invention is preferably used for a hygienic product such as a paper diaper.

EXAMPLES

The present invention will be more specifically explained with reference to Examples but is not limited thereto.

Each of the physical properties of the low crystalline polypropylene obtained in the following Preparation Example 1 was measured as follows.

Measurement of Elastic Modulus:

A press sheet with a thickness of 1 mm was prepared. The test piece based on JIS $K_{7113}$ (2002)-2½ was taken from this obtained press sheet. By using a tensile tester (Autograph AG-I, available from Shimadzu Corporation), the initial length L0 was set to 40 mm, the test piece was elongated at a tensile speed of 100 mm/minute until the test piece was broken, the strain and the load capacity in the elongation were measured, and then the initial elastic modulus was calculated according to the following expression.

Initial elastic modulus (N)=Load capacity at strain of 5% (N)/0.05

Measurement of Melting Point:

The melting point (Tm) was determined as the peak top observed on the highest temperature side of a melt endothermic curve obtained by maintaining the temperature of 10 mg of the sample at −10° C. for 5 minutes and then increasing it at 10° C./minute by using a differential scanning calorimeter (DSC-7 available from PerkinElmer, Inc.) under a nitrogen atmosphere.

Measurement of Crystallization Temperature:

The crystallization temperature (Tc) was determined as the peak top observed on the highest temperature side of an exothermic curve obtained by maintaining the temperature of 10 mg of the sample at 220° C. for 5 minutes and then decreasing it to −30° C. at 20° C./minute by using a differential scanning calorimeter (DSC-7 available from PerkinElmer, Inc.) under a nitrogen atmosphere.

Evaluation of Stereoregularity: NMR Measurement

The $^{13}$C-NMR spectrum was measured with the following device under the following conditions. The peak assignment followed to the method proposed by A. Zambelli, et al., "Macromolecules, vol. 8, p. 687 (1975)".

Device: $^{13}$C-NMR spectrometer, JNM-EX400 series available from JEOL, Ltd

Method: proton complete decoupling

Concentration: 220 mg/mL

Solvent: mixed solvent of 1,2,4-trichlorobenzene and deuterated benzene at 90:10 (volume ratio)

Temperature: 130° C.

Pulse width: 45°

Pulse repetition time: 4 seconds

Accumulation: 10,000 times

Calculating Expressions:

$$M = m/S \times 100$$

$$R = \gamma/S \times 100$$

$$S = P\beta\beta + P\alpha\beta + P\alpha\gamma$$

S: signal intensity of carbon atoms in side chain methyl of all the propylene units Pββ: 19.8 to 22.5 ppm Pαβ: 18.0 to 17.5 ppm Pαγ: 17.5 to 17.1 ppm γ: racemic pentad chain, 20.7 to 20.3 ppm m: mesopentad chain, 21.7 to 22.5 ppm The mesopentad fraction [mmmm], the racemic pentad fraction [rrrr] and the racemic-meso-racemic-meso pentad fraction [rmrm] are measured in accordance with the method proposed by A. Zambelli, et al., "Macromolecules, vol. 6, p. 925 (1973)", in the pentad units of the polypropylene molecular chain that are measured based on a signal of the methyl group in the $^{13}$C-NMR spectrum. As the mesopentad fraction [mmmm] increases, the stereoregularity increases. The triad fractions [mm], [rr], and [mr] were also calculated by the above-mentioned method.

Measurement of Weight-Average Molecular Weight (Mw) and Molecular Weight Distribution (Mw/Mn):

The weight average molecular weight (Mw) and the molecular weight distribution (Mw/Mn) were determined by gel permeation chromatography (GPC). The following device and conditions were used in this measurement to obtain a polystyrene conversion weight average molecular weight.

GPC Device

Column: TOSO GMHHR—H(S)HT

Detector: RI detector for liquid chromatography, Waters 150 C

Measurement Conditions

Solvent: 1,2,4-trichlorobenzene

Measurement temperature: 145° C.

Flow rate: 1.0 mL/minute

Sample concentration: 2.2 mg/mL

Injection amount: 160 μL

Calibration curve: Universal Calibration

Analysis software: HT-GPC (ver. 1.0)

Measurement of Melt Flow Rate (MFR):

The MFR was measured at a temperature of 230° C. under a weight of 21.18 N in accordance with JIS K7210.

Production Example 1 (Low Crystalline Polypropylene)

In a stainless steel reactor equipped with a stirrer, the inner capacity of which is 20 L, n-heptane, triisobutylaluminum, and a catalyst component which was obtained by bringing dimethyl anilinium tetrakis pentafluorophenyl borate, (1,2'-dimethylsilylene) (2,1'-dimethylsilylene)-bis(3-trimethylsilylmethylindenyl)zirconium dichloride, triisobutylaluminum, and propylene into contact with each other in a mass ratio of 1:2:20 in terms of zirconium were continuously fed at 20 L/h, 15 mmol/h, and 6 μmol/h, respectively.

The mixture was polymerized at a polymerization temperature set at 67° C. by continuously feeding propylene and hydrogen to maintain a hydrogen concentration of 0.8% by mol in the gas phase of the reactor and a total pressure of 0.7 MPa in the reactor (gauge pressure).

In the obtained polymerization solution, "Irganox 1010" (available from Ciba Specialty Chemicals Co., Ltd.) as a stabilizer was added so that the content ratio is 500 ppm by mass. Subsequently, n-heptane as a solvent was removed to obtain a low crystalline polypropylene with the physical properties shown in Table 1.

TABLE 1

|  |  | Preparation Example 1 |
|---|---|---|
|  | Elastic modulus (MPa) | 45 |
|  | Melting point (Tm) (° C.) | 70 |
|  | Crystallization temperature (Tc) (° C.) | 36 |
|  | MFR (g/10 minutes) | 60 |
|  | [mm] (% by mol) | 63.6 |
| (1) | [mmmm] (% by mol) | 46.5 |
| (2) | [rrrr]/(1 − [mmmm]) | 0.036 |
| (3) | [rmrm] (% by mol) | 3.0 |
| (4) | [mm] × [rr]/[mr]$^2$ | 1.4 |
| (5) | Mw | 120,000 |
| (6) | Mw/Mn | 2.0 |

The static friction coefficients and the bending resistances of the spunbond nonwoven fabrics obtained in the following Examples 1 and 2 and Comparative Example 1 were measured as described below.

Measurement of Static Friction Coefficient:

A pair of test pieces each having a length of 220 mm and a width of 100 mm and a length of 220 mm and a width of 70 mm was taken from the spunbond nonwoven fabric obtained in Examples 1 and 2 and Comparative Example 1 in each of the machine direction (MD) and a transversal direction (TD) perpendicular to the machine direction. The pair of the nonwoven fabrics was overlaid on the seating of a static friction coefficient measuring device (friction measuring device AN type available from TOYO SEIKI KOGYO CO. LTD). On the pair of the nonwoven fabrics, a weight of 1,000 g was added. The seating was inclined at a rate of 2.7 degrees/minute. The angle when the nonwoven fabrics slipped 10 mm was measured. From the added weight (1,000 g) and the angle when the nonwoven fabrics slipped 10 mm, the static friction coefficient was calculated.

As the static friction coefficient decreases, the additive is bled out more. The smaller friction coefficient shows that the spunbond nonwoven fabric has more excellent texture such as tactile feel.

Measurement of Bending Resistance:

The bending resistances of the spunbond nonwoven fabrics obtained in the following Examples 1 and 2 and Comparative Example 1 were measured as described below. The bending resistance corresponds to a bending length obtained by cantilever measurement.

The smaller bending resistance shows that the flexibility is more excellent.

Measuring Method:

The test piece was disposed on a horizontal table, one end of which has an incline of 45°, and then slipped toward the incline. The position of the other end when the one end of the test piece came into contact with the incline was read on a scale.

This measuring method is referred to as "cantilever measurement". The movement distance of the nonwoven fabric when the other end comes into contact with the incline is referred to as "bending length". The smaller bending length shows that the flexibility is more excellent.

Example 1

Production of Single-Layered Spunbond Nonwoven Fabric

The low crystalline polypropylene obtained in Preparation Example 1 was mixed with a high crystalline polypropylene (PP, NOVATEC SA03 available from Japan Polypropylene Corporation, elastic modulus=1,600 MPa, MFR=30 g/10 minutes, melting point=about 164° C.) and a slipping agent (lubricant) masterbatch consisting of 95% by mass of a high crystalline polypropylene (PP, Y6005GM available from Prime Polymer Co., Ltd.) and 5% by mass of erucamide, in a mixing ratio of 10, 86, and 4% by mass, respectively, to obtain a crystalline resin composition (I). These components were used to produce a nonwoven fabric with a spunbonding device as described below.

The raw materials were spun so that the materials were melt-extruded with a single screw extruder at a resin temperature of 230° C. and so that the melt-extruded materials were ejected from a core-sheath composite nozzle with a nozzle diameter of 0.3 mm (the number of pores: 841) at a rate of 0.5 g/minute per single pore. The spun fiber was sucked at an ejector pressure of 2.0 kg/cm² while being cooled by air and then was laminated on a net surface moving at a line speed of 49 m/min. The laminated fiber bundle was embossed with an embossing roll heated to 135° C. under a line pressure of 40 kg/cm and wound to a winding roll. The static friction coefficient and the bending resistance of the untreated spunbond nonwoven fabric obtained by the above-mentioned production process were measured.

Subsequently, the obtained untreated spunbond nonwoven fabric was annealed at 45° C. for 24 hours with an oven. Table 2 shows the static friction coefficient of the obtained spunbond nonwoven fabric.

Example 2

Production of Single-Layered Spunbond Nonwoven Fabric

A spunbond nonwoven fabric was produced in the same way as Example 1 except that the low crystalline polypropylene was mixed with a high crystalline polypropylene (PP, NOVATEC SA03 available from Japan Polypropylene Corporation) and a slipping agent (lubricant) masterbatch consisting of 95% by mass of a high crystalline polypropylene (PP, Y6005GM available from Prime Polymer Co., Ltd.) and 5% by mass of erucamide, in a mixing ratio of 5, 91, and 4% by mass, respectively. Table 2 shows the static friction coefficient and the bending resistance of the spunbond nonwoven fabric.

Comparative Example 1

Production of Single-Layered Spunbond Nonwoven Fabric

A spunbond nonwoven fabric was produced in the same way as Example 1 except that the annealing was not conducted. Table 2 shows the static friction coefficient and the bending resistance of the thus obtained untreated spunbond nonwoven fabric.

Comparative Example 2

Production of Single-Layered Spunbond Nonwoven Fabric

A spunbond nonwoven fabric was produced in the same way as Example 2 except that the annealing was not conducted. Table 2 shows the static friction coefficient and the bending resistance of the thus obtained untreated spunbond nonwoven fabric.

Comparative Example 3

Production of Single-Layered Spunbond Nonwoven Fabric

A spunbond nonwoven fabric was produced in the same way as Example 1 except that the low crystalline polypropylene was not used but a high crystalline polypropylene (PP, NOVATEC SA03 available from Japan Polypropylene Corporation) was mixed with a slipping agent (lubricant) masterbatch consisting of 95% by mass of a high crystalline polypropylene (PP, Y6005GM available from Prime Polymer Co., Ltd.) and 5% by mass of erucamide, in a mixing ratio of 96 and 4% by mass, respectively to obtain a crystalline resin composition. Table 2 shows the static friction coefficient and the bending resistance of the spunbond nonwoven fabric.

Comparative Example 4

Production of Single-Layered Spunbond Nonwoven Fabric

A spunbond nonwoven fabric was produced in the same way as Comparative Example 3 except that the annealing was not conducted. Table 2 shows the static friction coefficient and the bending resistance of the thus obtained untreated spunbond nonwoven fabric.

Comparative Example 5

Production of Single-Layered Spunbond Nonwoven Fabric

A spunbond nonwoven fabric was produced in the same way as Example 1 except that the mixing ratio of the raw materials was changed as described in Table 2 and that the annealing was not conducted. Table 2 shows the static friction coefficient and the bending resistance of the thus obtained untreated spunbond nonwoven fabric.

TABLE 2

|  |  |  | Example | | Comparative Example | | | | |
|---|---|---|---|---|---|---|---|---|---|
|  |  |  | 1 | 2 | 1 | 2 | 3 | 4 | 5 |
| Raw materials (% by mol) *1 | (a) Low crystalline polypropylene (Preparation Example 1) | | 10 | 5 | 10 | 5 | 0 | 0 | 90 |
|  | (b) High crystalline polypropylene | | 86 | 91 | 86 | 91 | 96 | 96 | 2 |
|  | (c) Slipping agent masterbatch | | 4 | 4 | 4 | 4 | 4 | 4 | 8 |
| Annealing (45° C., 24 hours) | | | Conducted | Conducted | Not conducted | Not conducted | Conducted | Not conducted | Not conducted |
| Properties of | Static friction coefficient before annealing | MD | 0.38 | 0.39 | 0.38 | 0.39 | 0.31 | 0.31 | 0.96 |
|  |  | TD | 0.45 | 0.48 | 0.45 | 0.48 | 0.4 | 0.40 | 0.97 |

TABLE 2-continued

| | | | Example | | Comparative Example | | | | |
|---|---|---|---|---|---|---|---|---|---|
| | | | 1 | 2 | 1 | 2 | 3 | 4 | 5 |
| spunbond nonwoven fabric | Static friction coefficient after annealing (Ratio of static friction coefficient after to before annealing) | MD | 0.19 (0.50) | 0.21 (0.54) | | | 0.28 (0.90) | | |
| | | TD | 0.29 (0.64) | 0.25 (0.52) | | | 0.33 (0.83) | | |
| | Bending resistance before annealing (mm) | MD | 43.4 | 47.5 | 43.4 | 47.5 | 48.3 | 48.3 | |
| | | TD | 35.1 | 38.9 | 35.1 | 38.9 | 37.0 | 37.0 | |
| | Bending resistance after annealing (mm) (Ratio of bending resistanc after to before annealing) | MD | 44.6 | 44.6 | | | 45.5 (0.94) | | |
| | | TD | 31.5 (0.90) | 34.0 (0.87) | | | 35.4 (0.96) | | |

*1: Except the component (c) of Comparative Exmaple 5.

Table 2 shows that the spunbond nonwoven fabric obtained by the method of the present invention has a small static friction coefficient. In other words, the promoted bleed out of the slipping agent (lubricant) and the addition of a small amount of the slipping agent (lubricant) can be said to provide a spunbond nonwoven fabric with an excellent texture such as smooth tactile feel. Furthermore, it is clear that the obtained spunbond nonwoven fabric has excellent flexibility.

In Comparative Example 3, since the low crystalline polypropylene was not used, the bleed-out of the slipping agent (lubricant) was less promoted even if the annealing was conducted.

The static friction coefficients of the spunbond nonwoven fabrics obtained in the following Examples 3 to 5 and Comparative Examples 5 to 9 were measured before and after the annealing as described above.

Example 3

Production of Spunbond Nonwoven Fabric Formed by Using Core-Sheath Composite Fiber As a sheath component, the low crystalline polypropylene obtained in Preparation Example 1 was mixed with a high crystalline polypropylene (PP, NOVATEC SA03 available from Japan Polypropylene Corporation) and a slipping agent (lubricant) masterbatch consisting of 95% by mass of a high crystalline polypropylene (PP, Y6005GM available from Prime Polymer Co., Ltd.) and 5% by mass of erucamide, in a mixing ratio of 25, 71, and 4% by mass, respectively to obtain a crystalline resin composition (I). As the core component, only the high crystalline polypropylene (PP, NOVATEC SA03 available from Japan Polypropylene Corporation) was used. These components were used to produce a nonwoven fabric with a spunbonding device as described below.

The raw materials of the sheath component resin and the core component resin were spun so that the materials were each separately melt-extruded with a single screw extruder at a resin temperature of 230° C. and so that the melt-extruded materials were ejected from a core-sheath composite nozzle with a nozzle diameter of 0.6 mm (the number of pores: 797) at a rate of 0.5 g/minute per single pore at a ratio of the sheath component [sheath/(core+sheath)] of 40% by mass.

The spun fiber was sucked at an ejector pressure of 2.0 kg/cm² while being cooled by air and then was laminated on a net surface moving at a line speed of 45 m/min. The fiber bundle laminated on the net surface was embossed with an embossing roll heated to 115° C. under a line pressure of 40 kg/cm and wound to a winding roll. Then, the static friction coefficient of the obtained spunbond nonwoven fabric was measured.

Subsequently, the obtained spunbond nonwoven fabric was annealed at 45° C. for 24 hours with an oven. Table 3 shows the static friction coefficient of the obtained spunbond nonwoven fabric.

Example 4

Production of Spunbond Nonwoven Fabric Formed by Using Core-Sheath Composite Fiber The spunbond nonwoven fabric was produced in the same way as Example 3 except that the melt-extruded materials were ejected in a ratio of the sheath component [sheath/(core+sheath)] of 20% by mass. Table 3 shows the static friction coefficient of the spunbond nonwoven fabric.

Example 5

Production of Spunbond Nonwoven Fabric Formed by Using Core-Sheath Composite Fiber The nonwoven fabric was produced in the same way as Example 3 except that the melt-extruded materials were ejected in a ratio of the sheath component [sheath/(core+sheath)] of 10% by mass. Table 3 shows the static friction coefficient of the spunbond nonwoven fabric.

Comparative Example 6

A spunbond nonwoven fabric was produced in the same way as Example 3 except that the annealing was not conducted. Table 3 shows the static friction coefficient of the spunbond nonwoven fabric.

Comparative Example 7

A spunbond nonwoven fabric was produced in the same way as Example 4 except that the annealing was not conducted. Table 3 shows the static friction coefficient of the spunbond nonwoven fabric.

Comparative Example 8

A spunbond nonwoven fabric was produced in the same way as Example 5 except that the annealing was not conducted. Table 3 shows the static friction coefficient of the spunbond nonwoven fabric.

Comparative Example 9

A spunbond nonwoven fabric was produced in the same way as Example 3 except that as the sheath component, the low crystalline polypropylene was not used but a high crystalline polypropylene (PP, NOVATEC SA03 available from Japan Polypropylene Corporation) was mixed with a slipping agent (lubricant) masterbatch consisting of 95% by mass of a high crystalline polypropylene (PP, Y6005GM available from Prime Polymer Co., Ltd.) and 5% by mass of erucamide, in a mixing ratio of 96 and 4% by mass, respectively to obtain a crystalline resin composition. Table 3 shows the static friction coefficient of the spunbond nonwoven fabric.

Comparative Example 10

A spunbond nonwoven fabric was produced in the same way as Comparative Example 9 except that the annealing was not conducted. Table 3 shows the static friction coefficient of the spunbond nonwoven fabric.

ing material, a thermal insulating material for a clothing material, a protective garment, a headwear, a face mask, a glove, an athletic supporter, an elastic bandage, a base cloth for a wet dressing, an antislipping base cloth, a vibration dampener, a finger stall, an air filter for a clean room, an electret filter, a separator, a thermal insulating material, a coffee bag, a food packaging material, a ceiling surface material for an automobile, an acoustic insulating material, a cushioning material, a dust proof material for a speaker, an air cleaner material, an insulator surface material, a backing material, an adhesive nonwoven fabric sheet, various automobile members including a door trim material, various cleaning materials including a cleaning material for a copying machine, a surface material and a backing material of a carpet, an agricultural rolled cloth, a wood draining material, a shoe material such as a surface material for sport shoes, a member for a bag, an industrial sealant, a wiping material, and a bed sheet. In particular, the spun nonwoven fabric of the present invention is preferably used for a hygienic product such as a paper diaper.

TABLE 3

|  |  |  | Example | | | Comparative Example | | | | |
| --- | --- | --- | --- | --- | --- | --- | --- | --- | --- | --- |
|  |  |  | 3 | 4 | 5 | 6 | 7 | 8 | 9 | 10 |
| Fiber composition | Core component (% by mass) | (b) High crystalline polypropylene | 100 | 100 | 100 | 100 | 100 | 100 | 100 | 100 |
|  | Sheath component (% by mass) | (b) High crystalline polypropylene | 71 | 71 | 71 | 71 | 71 | 71 | 96 | 96 |
|  |  | (a) Low crystalline polypropylene (Preparation Example 1) | 25 | 25 | 25 | 25 | 25 | 25 | 0 | 0 |
|  |  | (c) Slipping agent masterbatch | 4 | 4 | 4 | 4 | 4 | 4 | 4 | 4 |
|  | [Sheath component/ (Sheath component + Core component)] (% by mass) |  | 40 | 20 | 10 | 40 | 20 | 10 | 20 | 20 |
| Annealing (45° C., 24 hours) |  |  | Conducted | Conducted | Conducted | Not conducted | Not conducted | Not conducted | Conducted | Not conducted |
| Properties of spunbond nonwoven fabric | Static friction coefficient before annealing | MD | 0.38 | 0.52 | 0.60 | 0.38 | 0.52 | 0.60 | 0.46 | 0.46 |
|  |  | TD | 0.41 | 0.54 | 0.65 | 0.41 | 0.54 | 0.65 | 0.50 | 0.59 |
|  | Static friction coefficient after annealing (Ratio of static friction coefficient after to before annealing) | MD | 0.30 (0.79) | 0.34 (0.65) | 0.48 (0.80) |  |  |  | 0.47 (1.02) |  |
|  |  | TD | 0.27 (0.66) | 0.35 (0.65) | 0.45 (0.69) |  |  |  | 0.55 (0.93) |  |

Table 3 shows that the spunbond nonwoven fabric obtained by the method of the present invention has a small static friction coefficient. In other words, the promoted bleed out of the slipping agent (lubricant) and the addition of a small amount of the slipping agent (lubricant) can be said to provide a spunbond nonwoven fabric with an excellent texture such as tactile feel.

In Comparative Example 9, since the low crystalline polypropylene was not used, the bleed-out of the slipping agent (lubricant) was less confirmed to be promoted even if the annealing was conducted.

INDUSTRIAL APPLICABILITY

The spunbond nonwoven fabric of the present invention is useful for, for example, a material for a disposable diaper, an elastic material for a diaper cover, an elastic material for a sanitary product, an elastic material for a hygienic product, an elastic tape, an adhesive plaster, an elastic material for a clothing material, an electric insulating material for a cloth-

The invention claimed is:

1. A method of producing a spunbond nonwoven fabric, the method comprising:
    annealing a spunbond nonwoven fabric comprising (I) a crystalline resin composition,
    wherein the crystalline resin composition (I) comprises
    (a) a low crystalline olefin polymer having an elastic modulus of 10 to 450 MPa and a melting point Tm of 20 to 100° C. in a content of 1 to 40% by mass,
    (b) a high crystalline olefin polymer having an elastic modulus of 500 to 2,000 MPa, the content of the component (b) being the rest, and
    (c) an additive in a content of 1 to 20,000 ppm by mass,
    wherein the low crystalline olefin polymer (a) comprises, in reacted form, one or more monomers selected from the group consisting of (i) ethylene and (ii) an α-olefin having 3 to 6 carbon atoms, and
    wherein the high crystalline olefin polymer (b) is a propylene homopolymer, a propylene-ethylene random copolymer, a propylene-ethylene-1-butene random copolymer, or a propylene-ethylene block copolymer.

2. The method of claim 1, wherein the additive (c) is an antistatic agent, a release agent, a wax, an electric property modifier, an antislip agent, an antiblocking agent, an anti-clouding agent, a lubricant, an anti-adhesive agent, or any mixture thereof.

3. The method of claim 1, wherein the additive (c) is a wax, a lubricant, or a mixture thereof.

4. The method of claim 1, wherein the annealing is conducted at a temperature of from 30 to 60° C. for 1 to 48 hours.

5. The method of claim 1, wherein the ratio of the static friction coefficient of a spunbond nonwoven fabric after annealing to the static friction coefficient of a spunbond nonwoven fabric before annealing (static friction coefficient after annealing/static friction coefficient before annealing) is 0.85 or less.

6. The method of claim 1, wherein the low crystalline olefin polymer (a) is a polypropylene polymer.

7. The method of claim 1, wherein the melting point Tm of the low crystalline olefin polymer (a) is 40 to 100° C.

8. The method of claim 1, wherein the melting point Tm of the low crystalline olefin polymer (a) is 50 to 90° C.

9. The method of claim 1, wherein the melting point Tm of the low crystalline olefin polymer (a) is 60 to 80° C.

10. The method of claim 1, wherein the low crystalline olefin polymer (a) has a composition satisfying expressions (i) to (vi):

(i) [mmmm]=20 to 60% by mol,
(ii) [rrrr]/(1-[mmmm])≤0.1,
(iii) [rmrm]>2.5% by mol,
(iv) $[mm] \times [rr]/[mr]^2 \leq 2.0$,
(v) weight-average molecular weight Mw=10,000 to 200,000, and
(vi) molecular weight distribution Mw/Mn<4,
wherein [mmmm] represents a mesopentad fraction, [rrrr] represents a racemic pentad fraction, [rmrm] represents a racemic-meso-racemic-meso pentad fraction, [mm] represents a mesotriad fraction, [rr] represents a racemic triad fraction, and [mr] represents a meso-racemic triad fraction.

* * * * *